United States Patent
Park et al.

(10) Patent No.: US 10,666,122 B2
(45) Date of Patent: May 26, 2020

(54) IMPACT TYPE VIBRATION ACTUATOR

(71) Applicants: IMAGIS CO., LTD., Suwon-si (KR); KOREA UNIVERSITY OF TECHNOLOGY AND EDUCATION INDUSTRY-UNIVERSITY COOPERATION FOUNDATION, Cheonan-si (KR)

(72) Inventors: Won Hyeong Park, Cheonan-si (KR); Yong Jin Cho, Hwaseong-si (KR); Ho Pil Ahn, Suwon-si (KR); Eun Jae Shin, Jeju-si (KR); Sang Youn Kim, Seoul (KR)

(73) Assignees: IMAGIS CO., LTD., Suwon-si (KR); KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 5 days.

(21) Appl. No.: 16/194,826

(22) Filed: Nov. 19, 2018

(65) Prior Publication Data
US 2019/0157959 A1 May 23, 2019

(30) Foreign Application Priority Data
Nov. 21, 2017 (KR) .......................... 10-2017-0155348

(51) Int. Cl.
*H02K 33/14* (2006.01)
*H02K 33/16* (2006.01)

(52) U.S. Cl.
CPC .................................... *H02K 33/16* (2013.01)

(58) Field of Classification Search
CPC ........ H02K 33/16; H02K 33/00; H02K 7/063; H02K 7/1876; H02K 35/02
See application file for complete search history.

(56) References Cited

U.S. PATENT DOCUMENTS 6,326,706 B1 * 12/2001 Zhang .................... F04B 35/045
                                                         310/12.24
8,776,962 B2 * 7/2014 Lee ....................... H02K 41/031
                                                         188/267

(Continued)

FOREIGN PATENT DOCUMENTS

KR  10-2012-0011992 A  2/2012
KR  10-2013-0023853 A  3/2013

(Continued)

*Primary Examiner* — Thanh Lam
(74) *Attorney, Agent, or Firm* — Sughrue Mion, PLLC

(57) ABSTRACT

Provided is an impact type vibration actuator including a permanent magnet having a stopper insertion portion; a linear guide surrounding the permanent magnet; a stopper protruding into the linear guide and inserted into the stopper insertion portion; and coils provided on at least one end of the permanent magnet to provide alternately attraction and repulsion to the permanent magnet.

According to the present invention, since a permanent magnet is not connected to the vibration mass, it is possible to adjust the vibration frequency in a very wide range by adjusting the frequency of the power source applied to the coil, and to adjust vibration intensity by appropriately selecting current intensity, a stopper interval, an elastic means, and the like. In addition, through this, it is possible to provide much more various haptic feedbacks than the prior art.

6 Claims, 5 Drawing Sheets

(56) References Cited

U.S. PATENT DOCUMENTS

| | | | | |
|---|---|---|---|---|
| 8,937,411 B2* | 1/2015 | Kim | ............... | H02K 33/02 |
| | | | | 310/15 |
| 8,941,273 B2* | 1/2015 | Kim | ............... | H02K 33/00 |
| | | | | 310/15 |
| 9,608,506 B2* | 3/2017 | Degner | ............ | H02K 41/0356 |
| 2013/0221768 A1* | 8/2013 | Kawarai | ............ | H02K 35/02 |
| | | | | 310/30 |
| 2015/0015090 A1* | 1/2015 | Satou | ............ | H02K 33/00 |
| | | | | 310/15 |

FOREIGN PATENT DOCUMENTS

| | | | |
|---|---|---|---|
| KR | 10-1322941 | B1 | 11/2013 |
| KR | 10-1335025 | B1 | 12/2013 |

\* cited by examiner

[FIG. 1]
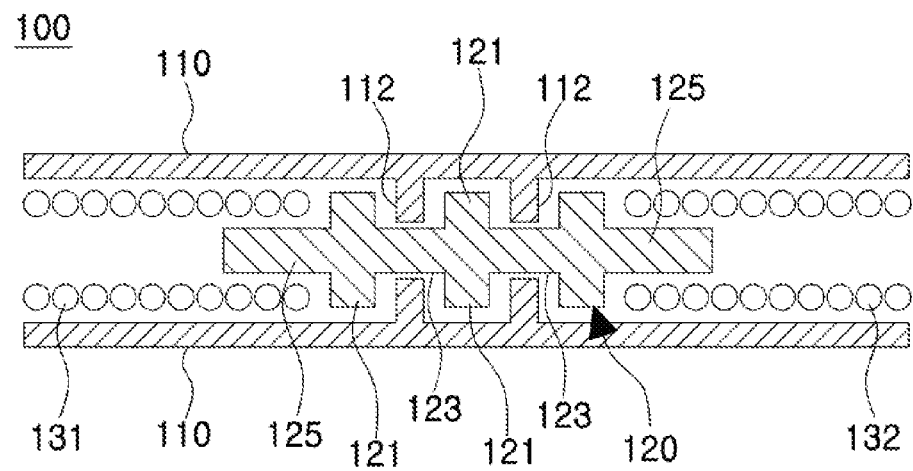
[FIG. 2A]
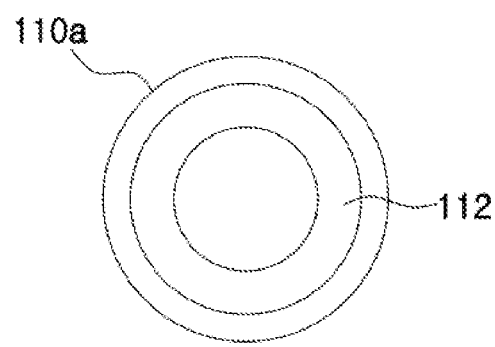
[FIG. 2B]
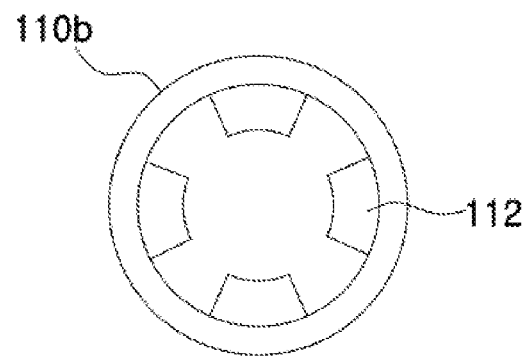

[FIG. 3]
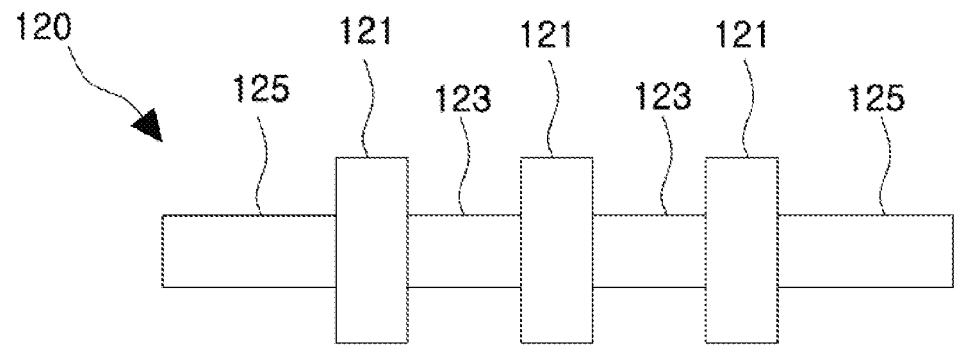
[FIG. 4]
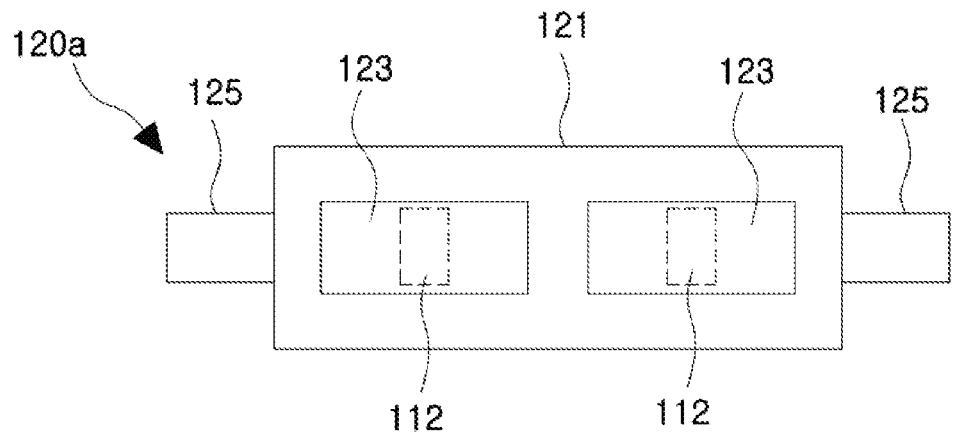
[FIG. 5]
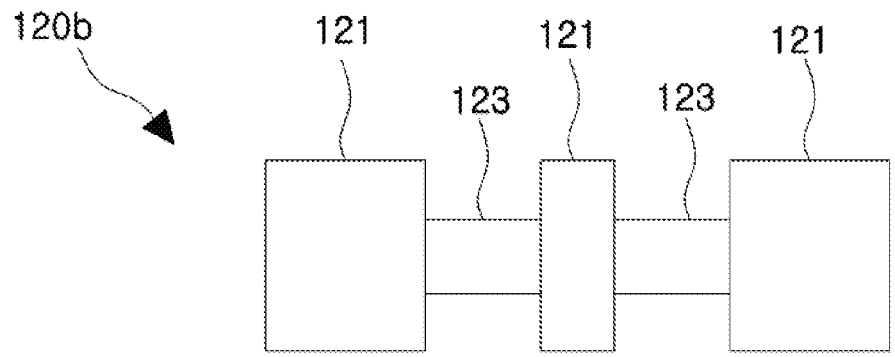

[FIG. 6]
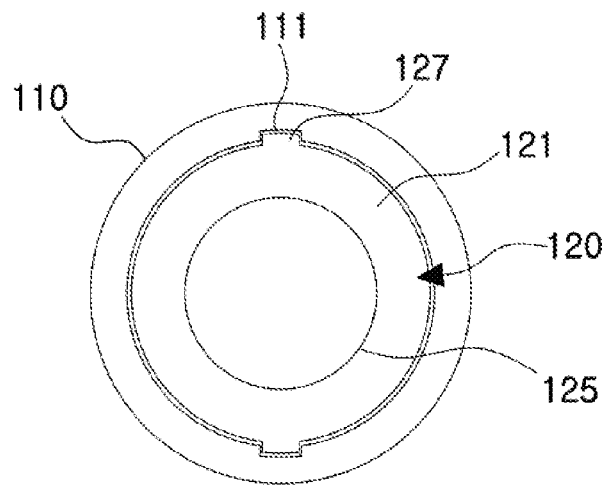
[FIG. 7]
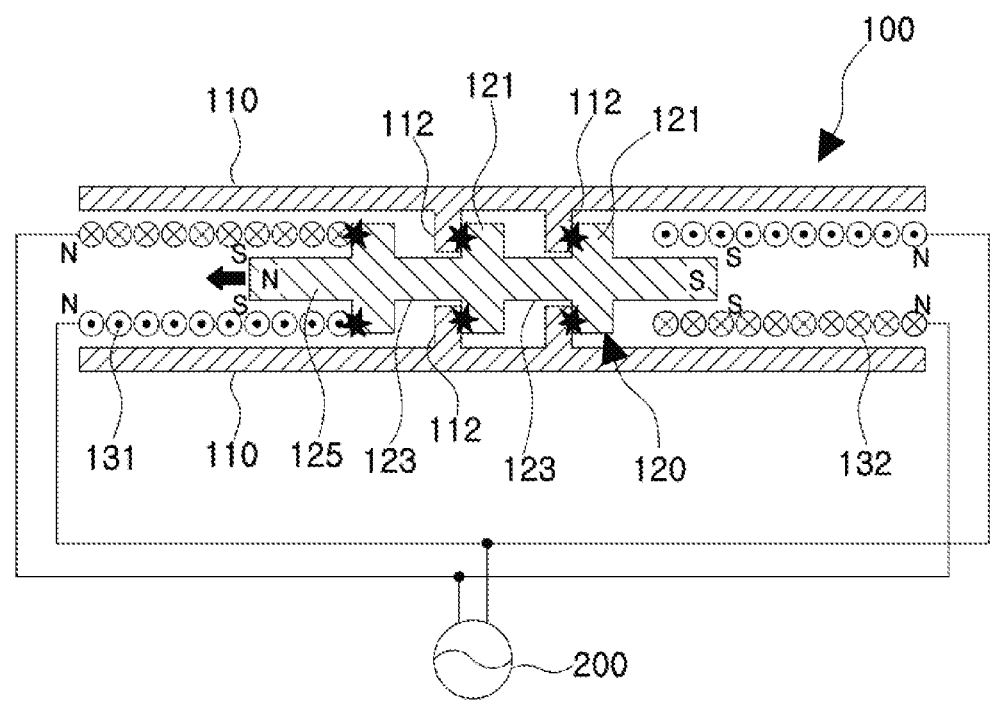

[FIG. 8]
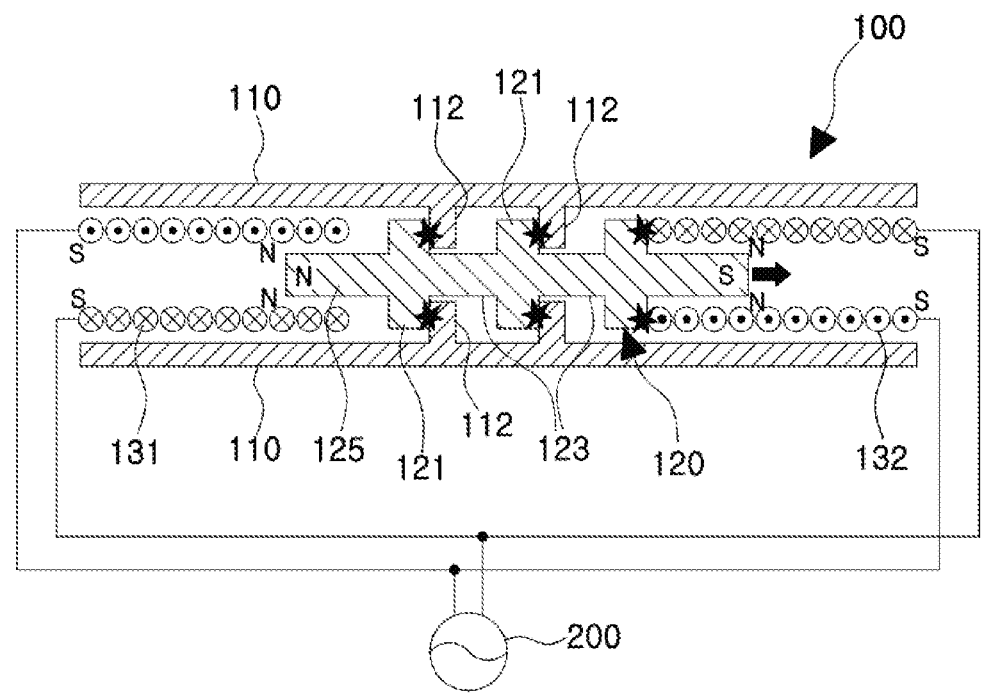
[FIG. 9]
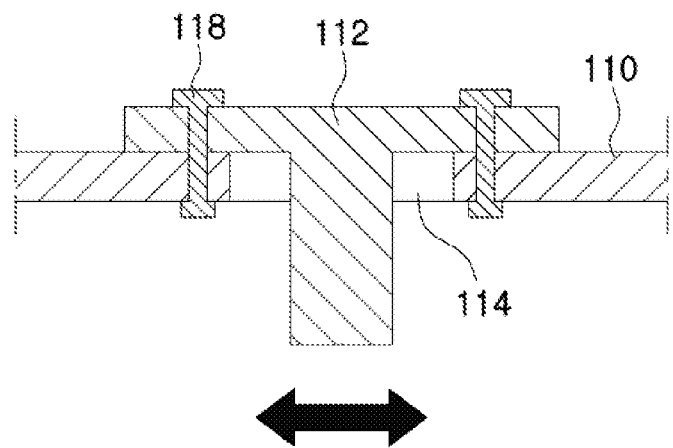

[FIG. 10]
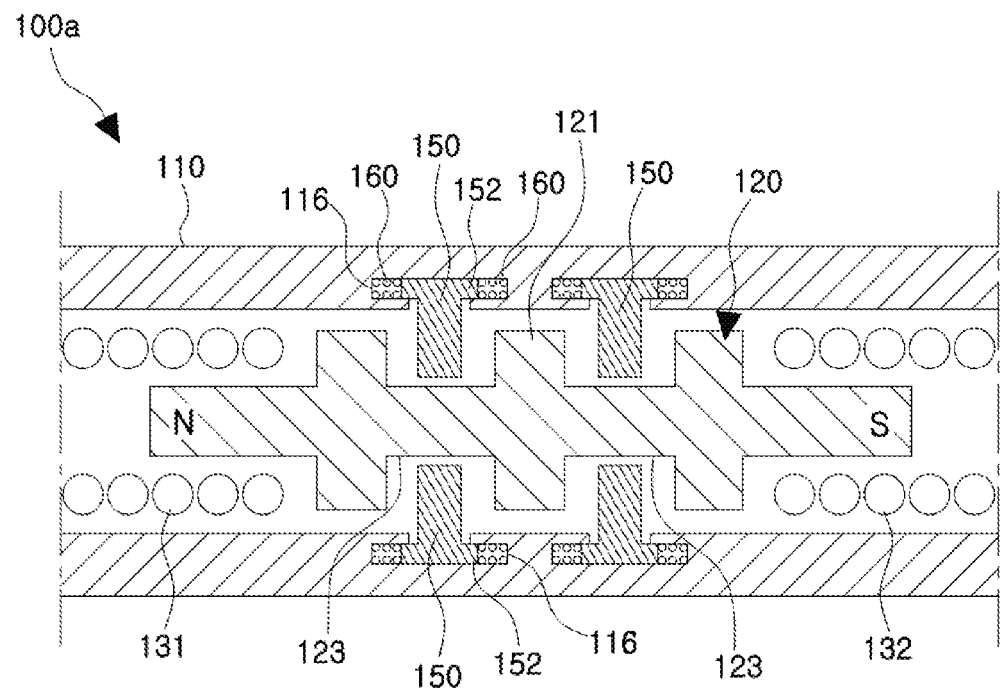
[FIG. 11]
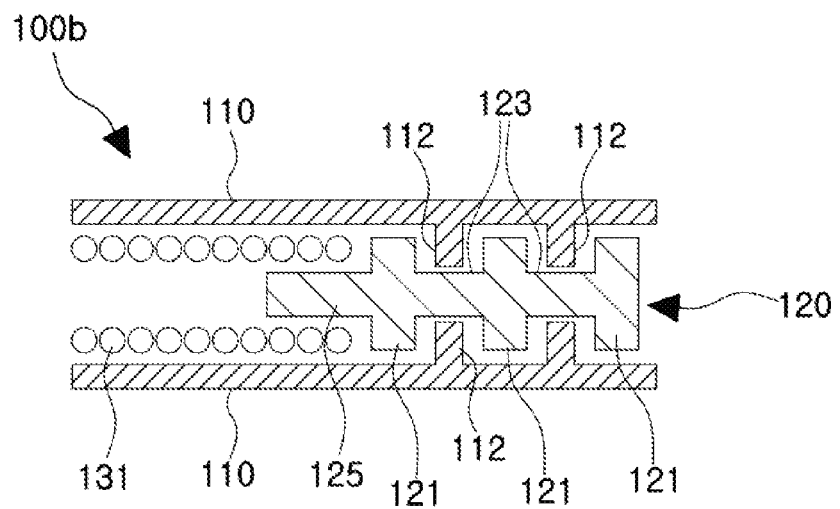

IMPACT TYPE VIBRATION ACTUATOR

TECHNICAL FIELD

The present invention relates to a vibration actuator, and more particularly, to an impact type vibration actuator that generates vibration using a permanent magnet moving by a coil and colliding with a stopper.

BACKGROUND ART

Recently, in portable electronic devices, virtual reality devices, remote-controlled manipulators, training simulators, and the like, vibration actuators are provided to provide various vivid haptic feedbacks to users.

In the vibration actuators, there are various types such as an eccentric rotating mass (ERM), a linear resonant actuator (LRA), a piezoelectric element actuator, and an electroactive polymer actuator.

Among them, the LRA generates the vibration by reciprocating a vibration mass connected to the permanent magnet linearly by inductive magnetic force of the coil and has been most widely used because a response speed is fast, the power consumption is low, and the durability is excellent as compared with an ERM.

However, in the conventional LRA, since a vibration frequency is limited to a resonance frequency of the vibration mass, it is difficult to provide various haptic feedbacks.

[Prior Art Document] Korean Patent No. 10-1597026 (issued on Mar. 7, 2016)

DISCLOSURE

Technical Problem

The present invention has been made to solve the above-mentioned problems, and an object of the present invention is to provide more various haptic feedbacks by adjusting a vibration frequency of a vibration actuator as needed.

Technical Solution

In order to achieve the object, an aspect of the present invention provides an impact type vibration actuator including a permanent magnet having a stopper insertion portion; a linear guide surrounding the permanent magnet; a stopper protruding into the linear guide and inserted into the stopper insertion portion; and coils provided on at least one end of the permanent magnet to provide alternately attraction and repulsion to the permanent magnet.

The stopper insertion portion may be an annular groove formed on a surface of the permanent magnet in a direction crossing a longitudinal direction, a plurality of stopper insertion portions may be spaced apart from each other in the longitudinal direction of the permanent magnet, and the stopper may be inserted in each of the plurality of stopper insertion portions.

The stopper insertion portion may be a plurality of rectangular grooves formed in the longitudinal direction of the permanent magnet, and the stopper may be inserted in each of the plurality of rectangular grooves.

The vibration frequency may be changed by adjusting a frequency of a power source applied to the coil.

The linear guide may be provided with a slot for changing the position of the stopper, and the stopper may be detachably coupled to the linear guide while being inserted into the slot.

A stopper guide groove may be formed on the inner wall of the linear guide, a flange formed at one end of the stopper may be inserted into the stopper guide groove, and an elastic means may be provided between the flange and the inner wall of the stopper guide groove.

Advantageous Effects

According to the present invention, since a permanent magnet is not connected to the vibration mass, it is possible to adjust the vibration frequency in a very wide range by adjusting the frequency of the power source applied to the coil, and to adjust vibration intensity by appropriately selecting current intensity, a stopper interval, an elastic means, and the like. In addition, through this, it is possible to provide much more various haptic feedbacks than the prior art.

DESCRIPTION OF DRAWINGS

FIG. 1 is a schematic cross-sectional view of a vibration actuator according to an embodiment of the present invention.

FIGS. 2A and 2B are views illustrating various types of stoppers formed in a linear guide.

FIG. 3 is a view illustrating an embodiment of a permanent magnet.

FIG. 4 is a view illustrating another embodiment of a permanent magnet.

FIG. 5 is a view illustrating yet another embodiment of a permanent magnet.

FIG. 6 is a view illustrating a state in which a guide protrusion of the permanent magnet is inserted into a magnet guide groove of a linear guide.

FIGS. 7 and 8 are views illustrating an operation of the vibration actuator according to the embodiment of the present invention.

FIG. 9 is a view illustrating a position adjustable stopper.

FIG. 10 is a view of one modification of the vibration actuator according to the embodiment of the present invention.

FIG. 11 is a view of another modification of the vibration actuator according to the embodiment of the present invention.

MODES OF THE INVENTION

Hereinafter, preferred embodiments of the present invention will be described with reference to the drawings.

For reference, in the present specification, when an element is connected, coupled, or electrically connected to another element, an element is directly connected, coupled, or electrically connected to other elements, or indirectly connected, coupled, or electrically connected with other elements with another element interposed therebetween.

Further, when an element is directly connected, coupled, or electrically connected to other elements, it means that no other element is interposed therebetween. Further, a meaning that any part includes or provides any element does not exclude other elements unless specifically stated otherwise, but may further include or provide other elements.

Further, although the drawings of the present specification may comprise representation of different dimension or ratio from the actual dimension or ratio for convenience of understanding, the scope of the present invention should not be limitedly construed by the representation of the drawings.

As illustrated in a schematic cross-sectional view of FIG. 1, a vibration actuator 100 according to an embodiment of the present invention includes a linear guide 110, a permanent magnet 120 installed inside the linear guide 110, and a first coil 131 and a second coil 132 disposed at both ends of the permanent magnet 120, respectively. In this specification, for convenience of description, a direction in which the permanent magnet 120 reciprocates is defined as a longitudinal direction of the vibration actuator 100.

The linear guide 110 serves to guide the movement of the permanent magnet 120 while supporting the permanent magnet 120 and limit the movement range of the permanent magnet 120. In addition, the linear guide 110 includes a stopper 112 that collides with the permanent magnet 120 to generate vibration.

A plurality of stoppers 112 may be spaced apart from each other in the longitudinal direction of the vibration actuator 100. A part of the permanent magnet 120 is inserted into a space between the adjacent stoppers 112.

The linear guide 110 may be a pipe shape or a bucket shape having a circular, elliptical, or polygonal cross section. The linear guide 110 may surround only the permanent magnet 120 or may surround the permanent magnet 120 and the first and second coils 131 and 132. The linear guide 110 may be a housing of the vibration actuator 100.

The linear guide 110 is preferably a magnetic material such as pure iron, but is not limited thereto.

The stopper 112 protrudes toward the inside of the linear guide 110. For example, as illustrated in a side view of FIG. 2A, an annular stopper 112 may protrude inward from the inner wall of the linear guide 110. It is preferable that the annular stopper 112 is disposed in a direction orthogonal to the longitudinal direction of the vibration actuator 100.

Instead of the annular stopper 112, as illustrated in FIG. 2B, a plurality of stoppers 12 discontinuously disposed may protrude inward from the inner wall of the linear guide 110.

As illustrated in FIG. 3, the permanent magnet 120 includes a body 121, a stopper insertion portion 123 formed in a groove shape on the surface of the body 121, and a coil insertion portion 121 formed at one end or the other end of the body 121.

The stopper insertion portion 123 may be formed as an annular groove around the center axis of the body 121. The annular groove is preferably formed in a direction orthogonal to the longitudinal direction of the permanent magnet 120, but may alternatively be formed in a direction crossing obliquely at a predetermined angle. In this case, the annular groove may be formed at 360° around the center axis of the body 121, or may be formed only in some angular sections. Further, the annular grooves may be formed continuously around the center axis of the body 121 or a plurality of grooves may be discontinuously formed around the center axis of the body 121.

Also, a plurality of annular grooves constituting the stopper insertion portion 123 may be spaced apart from each other in the longitudinal direction of the permanent magnet 120. In this case, the stopper 112 may be inserted into each of the plurality of stopper insertion portions 123.

On the other hand, the stopper insertion portion 123 is not necessarily formed as an annular groove. For example, as illustrated in FIG. 4, the stopper insertion portion 123 may be a rectangular groove elongated in the longitudinal direction on the surface of the body 121. In this case as well, a plurality of rectangular stopper insertion portions 123 may be spaced apart from each other in the longitudinal direction of the permanent magnet 120.

The length of the stopper insertion portion 123 needs to be designed to have an appropriate length in consideration of a moving distance of the permanent magnet 120 and the shape of the stopper 112. Further, a specific shape of the stopper insertion portion 123 needs to be designed corresponding to the shape of the stopper 112 provided in the linear guide 110.

The coil insertion portion 125 is a portion inserted into the coils 131 and 132. When the coil insertion portion 125 of the permanent magnet 120 is inserted into the coils 131 and 132, there is an advantage that stronger vibration may be generated by reinforcing an induced magnetic force.

However, the coil insertion portion 125 is not necessarily required and may be omitted as illustrated in FIG. 5.

Since the permanent magnet 120 reciprocates in the direction of the induced magnetic force formed by the first and second coils 131 and 132, a guide means for stable movement of the permanent magnet 120 may be formed inside the linear guide 110.

For example, as illustrated in FIG. 6, a guide protrusion 127 is formed on the body 121 of the permanent magnet 120, and a magnet guide groove 111 to which the guide protrusion 127 is inserted may be formed on the inner wall of the linear guide 110 in the longitudinal direction. On the contrary, the guide groove (not illustrated) is formed in the longitudinal direction on the body 121 of the permanent magnet 120, and the guide protrusion inserted into the guide groove may be formed on the inner wall of the linear guide 110.

The first coil 131 and the second coil 132 are solenoid coil, respectively, and generate an induced magnetic force corresponding to a direction in which a power source is applied. When an AC power source is applied to the coils, the direction of the induced magnetic force is alternately changed in correspondence with the frequency of the AC power source.

When the power source is connected to the first coil 131 and the second coil 132, it is preferable to connect the power source so that induced magnetic force is formed in directions opposite to each other.

Hereinafter, the operation of the vibration actuator 100 according to the embodiment of the present invention will be described.

First, it is assumed that the permanent magnet 120 is disposed such that an N pole faces the first coil 131 and an S pole faces the second coil 132, and the first coil 131 and the second coil 132 are connected to a power source 200 so as to generate induced magnetic forces opposite to each other in the same period.

In this state, as illustrated in FIG. 7, when the first coil 131 exerts attraction to the N pole of the permanent magnet 120 and the second coil 132 exerts repulsion against the S pole of the permanent magnet 120 by the AC power source 200 applied to the first coil 131 and the second coil 132, as the permanent magnet 120 moves toward the first coil 131, the stopper 112 strongly collides with the inner wall of one side of the stopper insertion portion 123 to stop the permanent magnet 120.

Subsequently, as illustrated in FIG. 8, when the AC power source 200 in the opposite direction is applied to the first coil 131 and the second coil 132, as the permanent magnet 120 moves toward the second coil 132, the stopper 112 strongly collides with the inner wall of the other side of the stopper insertion portion 123 to stop the permanent magnet 120.

When the AC power source 200 is supplied, the vibration is generated by repeating such collision while the permanent magnet 120 reciprocates.

The collision period may vary depending on the frequency of the AC power source 200 and the collision speed may vary depending on the intensity of the current applied to the coils 131 and 132, the interval of the stopper 112, the length of the stopper insertion portion 123, and the like.

Therefore, according to the embodiment of the present invention, it is possible to generate very various kinds of vibrations by changing or selecting the frequency of the AC power source, the current intensity, the interval of the stopper 112, the length of the stopper insertion part 123, and the like.

As illustrated in FIG. 9, a slot 114 may be formed in a longitudinal direction of the linear guide 110 and the stopper 112 may be detachably fixed to any position using a fixing member 118 while the stopper 112 is inserted into the slot 114. By installing each stopper 112 in this manner, the position of the stopper 112 may be easily changed, and as a result, the vibration intensity and the like may be adjusted.

Hereinabove, the preferred embodiments of the present invention has been described, but the present invention is limited to the aforementioned embodiments and can be modified or corrected in various forms.

As a modified example, the stopper 112 of the linear guide 110 is fixed in the above-described embodiments, but the present invention is not limited thereto, and therefore, a movable stopper 150 may be used as illustrated in FIG. 10.

That is, a stopper guide groove 116 may be formed on the inner wall of the linear guide 110, a flange 152 formed on the end of the movable stopper 150 is inserted into the stopper guide groove 116, and an elastic means 160 such as a spring may be provided between the flange 152 and the inner wall of the stopper guide groove 116.

Since a part of the impact energy generated when the permanent magnet 120 collides with the movable stopper 150 is absorbed by the elastic means 160, the impact intensity is different from the case that the elastic means 160 is not provided. In particular, the impact intensity varies depending on an elastic modulus of the elastic means 160, and thus, various types of vibrations may be generated by properly selecting the elastic modulus of the elastic means 160.

Further, by appropriately selecting and arranging the elastic means 160 having different elastic modulus instead of providing the same elastic means 160 to the plurality of movable stoppers 150, it is possible to generate vibrations of more complex and various patterns.

As another modified example, although the coils are provided on both sides of the permanent magnet 120 in the above-described embodiments, respectively, the coil 131 may be disposed only on one side of the permanent magnet 120 as illustrated in FIG. 11.

As described above, the present invention may be modified or changed in various forms in the specific applying process, and modified or changed embodiments include the scope of the present invention without departing from the technical spirit of the present invention disclosed in the appended claims.

EXPLANATION OF REFERENCE NUMERALS AND SYMBOLS

| | |
|---|---|
| 100: Vibrating actuator | 110: Linear guide |
| 111: Magnet guide groove | 112: Stopper |
| 114: Slot | 116: Stopper guide groove |
| 118: Fixing member | 120: Permanent magnet |
| 121: Body | 123: Stopper insertion portion |
| 125: Coil insertion portion | 127: Guide protrusion |
| 131: First coil | 132: Second coil |
| 150: Movable stopper | 152: Flange |
| 160: Elastic means | 200: Power supply unit |

The invention claimed is:

1. An impact type vibration actuator comprising:
a permanent magnet having a stopper insertion portion;
a linear guide surrounding the permanent magnet;
a stopper protruding into the linear guide and inserted into the stopper insertion portion; and
coils provided on at least one end of the permanent magnet to provide alternately attraction and repulsion to the permanent magnet.

2. The impact type vibration actuator of claim 1, wherein the stopper insertion portion is an annular groove formed on a surface of the permanent magnet in a direction crossing a longitudinal direction, a plurality of stopper insertion portions are spaced apart from each other in the longitudinal direction of the permanent magnet, and the stopper is inserted in each of the plurality of stopper insertion portions.

3. The impact type vibration actuator of claim 1, wherein the stopper insertion portion is a plurality of rectangular grooves formed in the longitudinal direction of the permanent magnet, and the stopper is inserted into each of the plurality of rectangular grooves.

4. The impact type vibration actuator of claim 1, wherein the vibration frequency is changed by adjusting a frequency of a power source applied to the coil.

5. The impact type vibration actuator of claim 1, wherein the linear guide is provided with a slot for changing the position of the stopper, and the stopper is detachably coupled to the linear guide while being inserted into the slot.

6. The impact type vibration actuator of claim 1, wherein a stopper guide groove is formed on the inner wall of the linear guide, a flange formed at one end of the stopper is inserted into the stopper guide groove, and an elastic means is provided between the flange and the inner wall of the stopper guide groove.

* * * * *